United States Patent
Cho

(10) Patent No.: US 6,563,924 B1
(45) Date of Patent: May 13, 2003

(54) SUBSCRIBER MATCHING CIRCUIT FOR ELECTRONIC EXCHANGE

(75) Inventor: Young-Ho Cho, Kyongsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/384,083

(22) Filed: Aug. 26, 1999

Related U.S. Application Data

(63) Continuation-in-part of application No. 09/382,681, filed on Aug. 25, 1999.

(30) Foreign Application Priority Data

Aug. 25, 1998 (KR) .............................................. 98-34480

(51) Int. Cl.$^7$ .............................. H04M 1/00; H04M 9/00
(52) U.S. Cl. .............. 379/399.01; 379/166; 379/413.02
(58) Field of Search ................................. 379/156, 162, 379/163, 166, 387.01, 399.01, 402, 413.12

(56) References Cited

U.S. PATENT DOCUMENTS

| | | | |
|---|---|---|---|
| 3,892,078 A | 7/1975 | Janssen et al. ................. 36/68 |
| 4,358,643 A | 11/1982 | Levy ........................... 379/402 |
| 4,381,561 A | 4/1983 | Treiber ....................... 370/294 |
| 4,456,991 A | 6/1984 | Chea, Jr. et al. ............ 370/359 |
| 4,461,929 A | 7/1984 | Britt ........................... 379/395 |
| 4,465,903 A | * 8/1984 | Barber ................... 379/399.01 |
| 4,538,031 A | * 8/1985 | Benning et al. ............. 379/166 |
| 4,759,059 A | 7/1988 | Christensen ................. 379/161 |
| 4,887,293 A | 12/1989 | Molnar ........................ 379/164 |
| 4,953,200 A | 8/1990 | Yamasaki .................... 379/156 |
| 5,602,912 A | 2/1997 | Hershbarger ................. 379/402 |
| 5,608,795 A | 3/1997 | Gay ....................... 379/399.01 |
| 5,710,811 A | 1/1998 | Tomasini et al. ........... 379/394 |
| 5,854,839 A | * 12/1998 | Chen et al. .................. 379/413 |
| 5,881,129 A | * 3/1999 | Chen et al. ..................... 379/5 |

* cited by examiner

Primary Examiner—Binh Tieu
(74) Attorney, Agent, or Firm—Robert E. Bushnell, Esq.

(57) ABSTRACT

A hybrid subscriber matching circuit for an electronic exchange which matches transmitted/received data so as to permit call communications between the exchange and subscribers. The subscriber matching circuit is constructed by individual parts without using a transformer or SLIC, and thus can simplify the peripheral parts thereof as well as strongly resist external impact.

30 Claims, 2 Drawing Sheets

SUBSCRIBER MATCHING CIRCUIT FOR ELECTRONIC EXCHANGE

This application is a continuation-in-part of Ser. No. 09/382,681 filed Aug. 25, 1999.

CROSS-REFERENCE TO CO-PENDING APPLICATION

This application makes reference to, incorporates the same herein and claims all benefits insuring under 35 U.S.C. §120 as a continuation-in-part of my application entitled *Subscriber Matching Circuit For Electronic Exchange* earlier filed in the United States Patent & Trademark Office on Aug. 25, 1999 and there duly assigned Ser. No. 09/382,681.

BACKGROUND OF THE INVENTION

1. Field of the Invention

The present invention relates to a subscriber matching circuit for an electronic exchange. In particular, the present invention relates to a subscriber matching circuit for an electronic exchange which matches transmitted/received data so as to permit call communications between the exchange and subscribers.

2. Description of the Related Art

Generally, in an electronic exchange, a subscriber matching circuit for matching with subscribers requires the functions of line current supply, supervision of a subscriber's state, call signal supply (ring signal supply) and detection, 2-line/4-line conversion, etc. The line current supply function serves to supply current for operating a subscriber's telephone and to supervise the on-hook/off-hook state of the telephone by detecting the variation of the supplied current. The line current supply function, which is performed with a function of limiting a maximum line current, serves to prevent an unnecessary power consumption due to an over-supply of the line current to a short-distance subscriber. The 2-line/4-line conversion function serves to convert a 4-line signal transmitted from the telephone exchange or through transmission lines into a 2-line signal, while converting the 2-line signal transmitted from the subscriber's telephone into the 4-line signal.

Such an analog type subscriber matching circuit may employ a transformer. However, it cannot be adapted to the present-day trend of the high-density integration and miniaturization due to its large size and magnetic saturation caused by the line current.

In order to adapt the trend of the high-density integration and miniaturization, the subscriber matching circuit has been integrated into an SLIC integrated circuit (IC). A subscriber matching circuit using the SLIC IC is disclosed in Korean Patent Application No.1994-40809 filed by the applicant of the present application. According to the subscriber matching circuit disclosed in Korean Patent Application No.1994-40809, however, all circuit elements are integrated onto one chip, and thus it is relatively vulnerable to external impact such as lightning strikes in comparison to the circuit employing a transformer. As a result, it requires a protection device as well as many peripheral parts thereof for performing the subscriber matching function, thereby increasing the possibility of experiencing difficulties in operation.

The following patents each discloses features in common with the present invention: U.S. Pat. No. 4,887,293 to Molnar, entitled TRUNK CIRCUIT WITH LOOP LENGTH GAIN EQUALIZATION, issued on Dec. 12, 1989; U.S. Pat. No. 4,953,200 to Yamasaki, entitled PRIVATE BRANCH EXCHANGE CAPABLE OF DISCRIMINATING DIFFERENT TYPES OF TELEPHONE SETS CONNECTED THERETO, issued on Aug. 28, 1990; U.S. Pat. No. 4,358,643 to Levy, entitled TWO TO FOUR WIRE HYBRID CIRCUIT, issued on Nov. 9, 1982; U.S. Pat. No. 5,602,912 to Hershbarger, entitled TELEPHONE HYBRID CIRCUIT, issued on Feb. 11, 1997; U.S. Pat. No. 5,608,795 to Gay, entitled TELEPHONE LINE INTERFACE CIRCUIT, issued on Mar. 4,1997; U.S. Pat. No. 5,710,811 to Tomasini et al., entitled SPEECH CIRCUIT FOR SUBSCRIBER TELEPHONE APPARATUS, issued on Jan. 20, 1998; U.S. Pat. No. 4,456,991 to Chea Jr. et al., entitled TELEPHONE LINE CIRCUIT AND SYSTEM, issued on Jun. 26, 1984; U.S. Pat. No. 4,381,561 to Treiber, entitled ALL DIGITAL LSI LINE CIRCUIT FOR ANALOG LINES, issued on Apr. 26, 1983; U.S. Pat. No. 4,759,059 to Christensen, entitled ANALOG TELEPHONE CIRCUIT FOR DIGITAL TELEPHONE SYSTEM, issued on Jul. 19,1988; U.S. Pat. No. 3,982,078 to Janssen et al., entitled LINE MATCHING CIRCUIT FOR USE IN A TONE PUSHBUTTON DIALING SUBSCRIBER'S SET PROVIDED WITH A TONE GENERATOR, issued on Sep. 21, 1976; and U.S. Pat. No. 4,461,929 to Britt, entitled AMPLIFIER FOR ELECTRONIC AND ELECTRO-MECHANICAL TRANSMITTERS, issued on Jul. 24, 1984.

SUMMARY OF THE INVENTION

It is an object of the-present invention to solve the problems involved in the related art, and to provide a hybrid subscriber matching circuit for an electronic telephone exchange which can simplify the peripheral parts thereof and strongly resist external impact.

In order to achieve the above object, there is provided a subscriber matching circuit for a full electronic exchange comprising: transistors Q1 and Q2 for supplying a line current to a subscriber. through a tip terminal and a ring terminal; transistors Q3 and Q4, having a Darlington structure and respectively connected to the transistors Q1 and Q2, for limiting a maximum current; current supervising resistors R1 and R2, respectively connected to emitters of the transistors Q1 and Q2, for performing a current feedback operation to limit the maximum current and detecting in a voltage from a line current flowing through telephone lines; a resistor R3, connected between a collector of the transistor Q1 and a collector of the transistor Q3, for preventing the transistor Q1 from being saturated; a resistor R4, connected between a collector of the transistor Q2 and a collector of the transistor Q4, for preventing the transistor Q2 from being saturated; three bias resistors R5, R6 and R7 for determining a threshold value of the maximum current and causing the transistors Q1 and Q2 to always be in an active region; capacitors C5 and C6 for superimposing a received AC audio signal on the DC line current; composite impedances ZL1 and ZL2 for matching with a line characteristic impedance; a resistor R11 for converting the line current flowing through the resistor R1 into an input current for detecting an off-hook state; an operational amplifier AMP3 for inversion-amplifying a signal inputted through the resistor R1, and a transistor Q5 for converting a level of a signal inversion-amplified by the operational amplifier AMP3.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be explained in detail with reference to the accompanying drawings.

Figure 1:
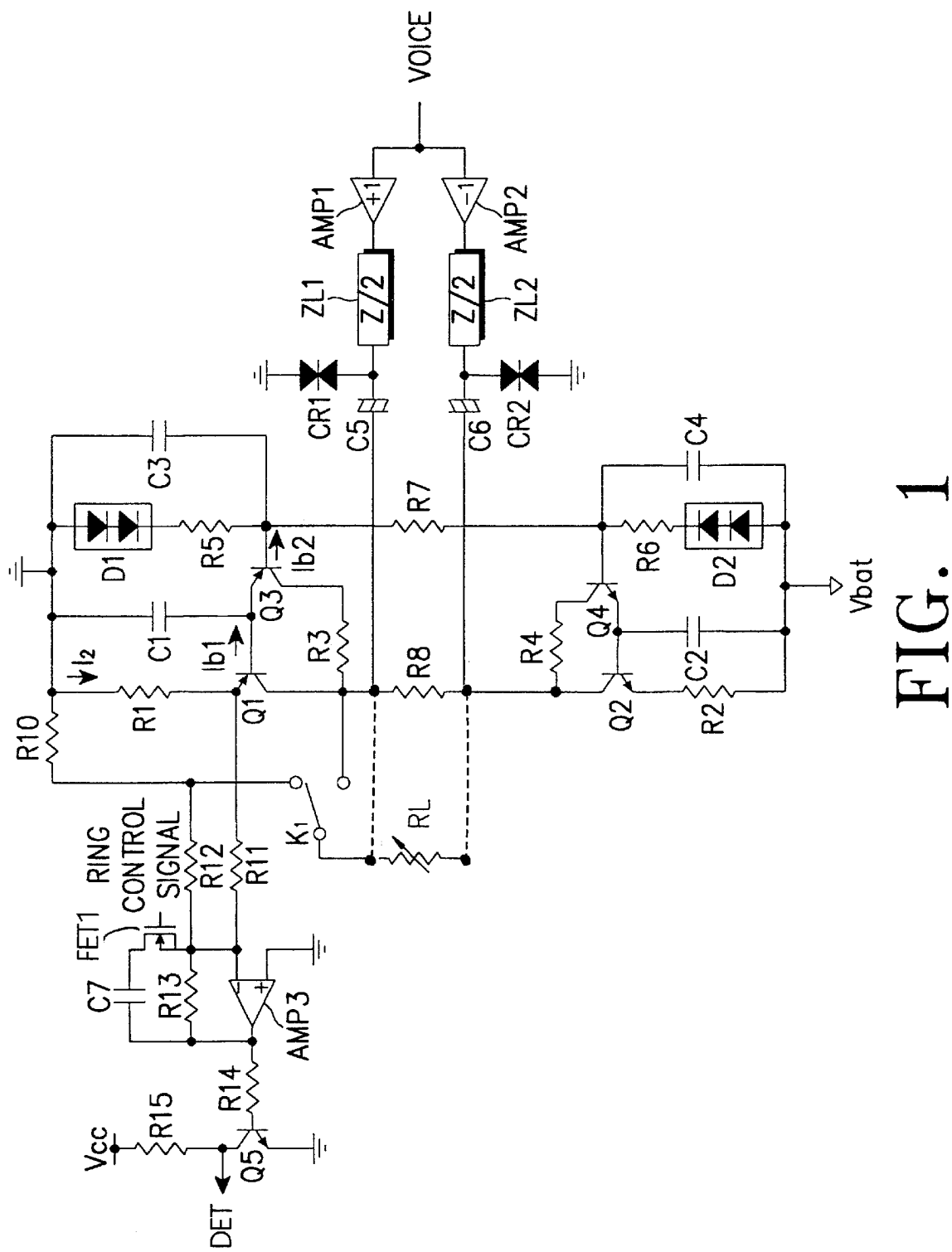
FIG. 1 is a schematic circuit diagram of the hybrid subscriber matching circuit according to a preferred embodiment of the present invention.

FIG. 1 is a schematic circuit diagram of the hybrid subscriber matching circuit according to a preferred embodiment of the present invention.

Referring to FIG. 1, the hybrid subscriber matching circuit according to the preferred embodiment of the present invention includes transistors Q1 and Q2 for supplying current, transistors Q3 and Q4 for limiting a maximum current, current supervising resistors R1 and R2 for performing a current feedback operation to limit the maximum current and for detecting in a voltage from a line current flowing through telephone lines, resistors R3 and R4 for preventing the transistors Q1 and Q2 from being saturated, bias resistors R5, R6 and R7 for determining a threshold value of the maximum current and causing the transistors Q1 and Q2 to always be in an active region, a dummy load resistor R8 for supplying a bias current to the transistors Q1 and Q2 to prevent the transistors Q1 and Q2 from being saturated when no fine load exists, temperature compensating diodes D1 and D2 for preventing the transistors from being overheated due to a variation of the threshold value of the maximum current which is caused by the heat generation of the transistors Q1 and Q2 due to the line current ($I_L$), bypass capacitors C1, C2, C3 and C4 for preventing a bad influence on call communications due to the generation or induction of noise in the DC line current supply, capacitors C5 and C6 for superimposing a received audio signal (i.e., an AC signal) on the DC line current, composite impedances ZL1 and ZL2 for matching with a line characteristic impedance, amplifiers AMP1 and AMP2 for receiving and amplifying the audio signal, protection elements CR1 and CR2 for protecting the amplifiers AMP1 and AMP2 from an overcurrent through the lines, a resistor R11 for converting the line current flowing through the resistor R1 into an input current for detecting an off-hook state, an operational amplifier AMP3 for inversion-amplifying a signal inputted through the resistor R11, a resistor R13 for determining an amplification factor of the signal inputted through the resistor R11, a transistor Q5 for converting a level of a signal minversion-amplified by the operational amplifier AMP3, a resistor R10 for detecting a ring trip voltage if a telephone handset is hooked off during supply of a call signal, a resistor R12 for converting the voltage detected by the resistor R10 into a ring trip current, a capacitor C7 for making the operational amplifier AMP3 serve as a low-pass filter so that an AC amplification factor is greatly lowered to remove AC ripple components included in the ring trip current, and a field effect transistor FET1 for making the operational amplifier AMP3 serve as a low-pass filter in a ring current supply state.

The resistor RL in FIG. 1 is an element which is not really a part of the subscriber matching circuit for an electronic exchange but it is introduced only to explain the operation of the subscriber matching circuit. Naturally, there exists resistance in the telephone line which is connected to the subscriber matching circuit and the resistance element RL indicates the existence of the resistance in the telephone line.

The ring relay K1 in FIG. 1 is an element which is switched to the resistor R10 in on-ring state and to the resistor R3 in off-ring state under the control of an exchanger in order to provide ring signals generated from a ring generator of the exchange (not shown) to the telephone.

Figure 2:
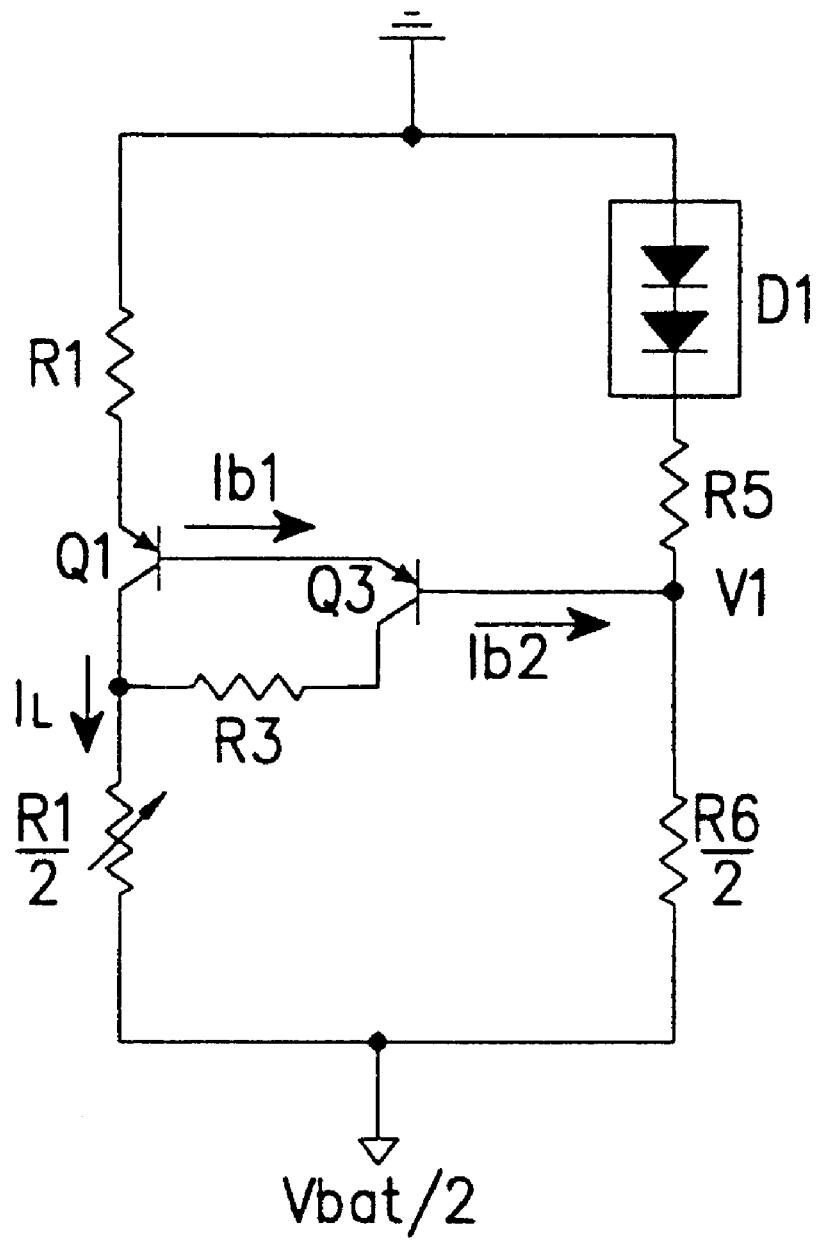
FIG. 2 is a schematic circuit diagram of the DC bias equivalent circuit according to a preferred embodiment of the present invention.

FIG. 2 is a schematic circuit diagram of the DC bias equivalent circuit according to a preferred embodiment of the present invention.

The operation of the preferred embodiment of the present invention will now be explained in detail with reference to FIGS. 1 and 2.

The transistors Q1 and Q2 are for supplying the current, and the transistors Q3 and Q4 are for limiting the maximum current. The equivalent circuit of FIG. 2 performs the line current supplying function. Since the circuit for supplying the line current has the construction in which a tip terminal and a ring terminal are symmetrically arranged, FIG. 2 illustrates only the equivalent circuit for the line current supply on the tip terminal side. Referring to FIG. 2, the line current ($I_L$) becomes $Ib1 * h_{FE}$.

The resistors R5 and R6 form a bias current Ib2 of the transistor Q2, which is given by the following mathematical expression 1.

[Expression 1]

$$Ib2 = \frac{(V1 - V_{BE1} - V_{BE3})}{(Rb + R1)}$$

$$V1 = \left(\frac{Vbat}{2} - 2V_D\right) \times \frac{R5}{\left(\frac{R6}{2} + R5\right)}$$

$$Rb = R5 // \frac{R6}{2}$$

The line current ($I_L$) increases if the resistance $R_L$ of the speech line decreases, and as the line current ($I_L$) increases, the terminal voltage $V_{R1}$ of the resistor R1 also increases. If the voltage $V_{RL}$ decreases due to the current feedback, which decreases the base current Ib1 of the transistor Q1, and the decrease of the resistance $R_L$ of the speech line, the collector voltage $V_{CE1}$ of the transistor Q1 increases, and this causes the increase of the current Ib1 through the resistor R3. The bias stability is improved by the voltage feedback which decreases the collector voltage $V_{CE1}$ of the transistor Q1. Another important role of the resistor R3 is to prevent the saturation of the transistor Q1. Specifically, if the resistance $R_L$ of the speech line increases, the line current ($I_L$) and the collector voltage $V_{CE1}$ of the transistor Q1 decrease. The decrease of the line current ($I_L$) causes the decrease of the amount of the current feedback through the resistor R1, and the continuous increase of the resistance $R_L$ of the speech line causes the continuous decrease of the line current ($I_L$), resulting in the collector voltage $V_{CE1}$ of the transistor Q1 greatly decreasing so as to reach the saturation region of the transistor Q1. At this time, the base current Ib1 of transistor Q1 which is supplied through the resistor R3 decreases due to the decrease of the collector voltage $V_C$ of the transistor Q1, and thus the saturation of the transistor Q1 is prevented. Actually, this prevents the distortion of the AC characteristic in a long loop in which the line resistance RL increases.

Also, the maximum current limitation is effected by the current feedback through the resistor R1. The increase of the line current $I_L$ causes the increase of the terminal voltage $V_{R1}$, and the current limitation is performed when the line current ($I_L$) reaches a value corresponding to the state that the voltage of $V_{R1}+V_{BE1}+V_{BE2}$ becomes equal to the voltage of V1. However, if the current limitation is actually generated due to the current increase, the $V_{CE}$ of the transistor Q1 increases, and this causes a power dissipation which may be as much as $I_L*V_{CE}$ to occur in the transistor Q1, resulting in heat generation in the transistor Q1. Since $V_{BE}$ is in negative proportion to the temperature (that is, −2.4 mV/°C.), $V_{BE}$ decreases as the temperature increases, and this causes the current limitation value increases. An undesirable repetition of such operations results in an error in the limited current. As a result, the maximum current, much higher than the limited current actually required, flows. In order to prevent this overheating phenomenon, the diode D1 which has a forward voltage-temperature characteristic is connected between the base of the transistor Q2 and the ground. In this case, since the forward voltage of the diode decreases at the same level as the $V_{BE}$ of the transistors Q1 and Q2 due to the heat generated in the transistor Q1, the variation of the limited current to the temperature is offset, and thus the limited current can be more stably determined. Although the transistors Q1 and Q2 are connected in a Darlington structure, the base current Ib1 of the transistor Q1 is actually limited by the resistor R3. The purpose of this construction is not to improve the voltage gain by supplying an input signal to the base of the transistor Q2, but to improve the gain of the current feedback performed by the resistor R1. In other words, when the resistance $R_L$ of the line varies within the range of the limited current, the limited current is kept constant with respect to the variation of $R_L$ of the line by the transistors Q1 and Q2.

Meanwhile, the line current supervising function serves to convert the line current into a logic signal by driving the transistor Q6 with an inversion-amplified output of the voltage variation of the resistor R1. The line current supervising circuit of FIG. 1 also performs the ring trip function simultaneously. Specifically, if the line current ($I_L$) increases, the voltage drop is generated by the resistor R1, and this voltage drop is inversion-amplified with the gain determined by the resistors R11 and R13 to drive the transistor Q6. If the transistor Q6 is driven, a logic "0" (low) signal is outputted from the collector of the transistor Q6 to a detection terminal DET. At this time, the line current ($I_L$) corresponding to the condition that the detection terminal DET is in the logic "0" state is determined by the resistors R11 and R12. The line current supervising circuit also supervises whether the handset is hooked off if the ring current is supplied during the supervision of the line current ($I_L$). Specifically, a ring relay K1 is switched to the resistor R10, and the ring current supplied from the ring terminal is applied to the tip terminal via the line resistance $R_L$ and the terminal telephone. In the off-hook state, the line resistance $R_L$ including the DC resistance of the terminal telephone decreases abruptly, and this causes the voltage drop across the resistor R10 to increase. This dropped voltage is applied to the inverting terminal of the operational amplifier AMP3 through the resistor R12 to be inversion-amplified. Accordingly, the output signal of the operational amplifier AMP3 becomes high, and is supplied to the base of the transistor Q6 to turn on the transistor Q6, so that a low level signal is outputted to the detection terminal DET to indicate the off-hook state of the telephone. When the voltage drop of the resistor R10 increases, the signal inputted to the inverting terminal of the operational amplifier AMP3 for inversion-amplifying the terminal voltage of the resistor R10 becomes the DC signal superimposed with the AC ring signal, and thus it is required to greatly reduce the gain of the inversion amplifier AMP with respect to the AC signal in order to detect the DC signal only. The reduction of the AC gain in the operational amplifier AMP3 invites the reduction of the AC gain by the capacitor C7 connected in parallel to the resistor R13, and thus the DC signal with its ripple component greatly suppressed is outputted from the operational amplifier AMP3, enabling the ring trip operation to be performed accurately. The field effect transistor FET1 is turned on only when the ring relay K1 operates, and thus has no effect on the line current supervising function in a normal state. At this time, since the capacitance of the capacitor C7 cannot be selected as an infinite value, the resistors R11, R12 and R13 should have a large resistance value in the range of several hundred kilo-ohms (KΩ) in order for the capacitor C7 having a small capacitance value to act as a low-pass filter.

As described above, the subscriber matching circuit according to the present invention is designed to use general parts while it performs the same function as the conventional analog subscriber matching circuit using a transformer or SLIC, and thus the manufacturing cost thereof can be greatly reduced.

Further, the subscriber matching circuit according to the present invention has an on-hook transmission function, and thus can be applied to additional services such as remote charging, transmission of a calling subscriber's number, etc.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An analog subscriber matching circuit for a full electronic exchange comprising:

a first transistor and a second transistor, for supplying a line current to a subscriber through a tip terminal and a ring terminal;

a third transistor and a fourth transistor, having a Darlington structure and respectively connected to the first and second transistors, for limiting a maximum current;

a pair of current supervising resistors, respectively connected to emitters of the first transistors, for performing a current feedback operation to limit the maximum current and for detecting in a voltage from a line current flowing through telephone lines;

a first resistor, connected between a collector of the first transistor and a collector of the third transistor, for preventing the first transistor from being saturated;

a second resistor, connected between a collector of the second transistor and a collector of the fourth transistor, for preventing the second transistor from being saturated;

a plurality of bias resistors for determining a threshold value of the maximum current and for maintaining the first and second transistors so as to always be in an active region, the plurality of bias resistors comprising three resistors connected in series;

a pair of first capacitors for superimposing a received AC audio signal on a DC line current;

a pair of composite impedances for matching with a line characteristic impedance;

a third resistor for converting the line current flowing through a first one of the current supervising resistors into an input current for detecting an off-hook state;

an operational amplifier for inversion-amplifying a signal inputted through the third resistor; and a fifth transistor for converting a level of a signal inversion-amplified by the operational amplifier.

2. The analog subscriber matching circuit of claim 1, further comprising a pair of amplifiers, respectively connected to the composite impedances, for receiving and amplifying the audio signal.

3. The analog subscriber matching circuit of claim 2, further comprising a pair of protection elements for protecting the pair of amplifiers from an overcurrent through lines.

4. The analog subscriber matching circuit of claim 3, further comprising a dummy load resistor, connected between the collector of the first transistor and the collector of the second transistor, for supplying a bias current to the first and second transistors to prevent the first and second transistors from being saturated when no line load exists.

5. The analog subscriber matching circuit of claim 4, further comprising a pair of temperature compensating diodes, respectively connected to opposite sides of the plurality of bias resistors, for preventing the first and second transistors from being overheated due to a variation of the threshold value of the maximum current caused by the heat generation of the first and second transistors due to the line current.

6. The analog subscriber matching circuit of claim 5, further comprising a plurality of bypass capacitors for preventing a bad influence on call communications due to the generation or induction of noise in the DC line current supply.

7. The analog subscriber matching circuit of claim 6, further comprising a fourth resistor for determining an amplification factor of the signal inputted through the third resistor.

8. The analog subscriber matching circuit of claim 7, further comprising a fifth resistor for detecting a ring trip voltage if a telephone handset is hooked off during supply of a call signal.

9. The analog subscriber matching circuit of claim 8, further comprising a sixth resistor for converting the voltage detected by the fifth resistor into a ring trip current.

10. The analog subscriber matching circuit of claim 9, further comprising a second capacitor for causing the operational amplifier to serve as a low-pass filter so that an AC amplification factor is greatly lowered to remove AC ripple components included in the ring trip current.

11. The analog subscriber matching circuit of claim 10, further comprising a field effect transistor for causing the operational amplifier to serve as a low-pass filter in a ring current supply state.

12. The analog subscriber matching circuit of claim 2, further comprising a dummy load resistor, connected between the collector of the first transistor and the collector of the second transistor, for supplying a bias current to the first and second transistors to prevent the first and second transistors from being saturated when no line load exists.

13. The analog subscriber matching circuit of claim 2, further comprising a pair of temperature compensating diodes, respectively connected to opposite sides of the plurality of bias resistors, for preventing the first and second transistors from being overheated due to a variation of the threshold value of the maximum current caused by the heat generation of the first and second transistors due to the line current.

14. The analog subscriber matching circuit of claim 3, further comprising a pair of temperature compensating diodes, respectively connected to opposite sides of the plurality of bias resistors, for preventing the first and second transistors from being overheated due to a variation of the threshold value of the maximum current caused by the heat generation of the first and second transistors due to the line current.

15. The analog subscriber matching circuit of claim 2, further comprising a plurality of bypass capacitors for preventing a bad influence on call communications due to the generation or induction of noise in the DC line current supply.

16. The analog subscriber matching circuit of claim 3, further comprising a plurality of bypass capacitors for preventing a bad influence on call communications due to the generation or induction of noise in the DC line current supply.

17. The analog subscriber matching circuit of claim 4, further comprising a plurality of bypass capacitors for preventing a bad influence on call communications due to the generation or induction of noise in the DC line current supply.

18. The analog subscriber matching circuit of claim 2, further comprising a second capacitor for causing the operational amplifier to serve as a low-pass filter so that an AC amplification factor is greatly lowered to remove AC ripple components included in the ring trip current.

19. The analog subscriber matching circuit of claim 3, further comprising a second capacitor for causing the operational amplifier to serve as a low-pass filter so that an AC amplification factor is greatly lowered to remove AC ripple components included in the ring trip current.

20. The analog subscriber matching circuit of claim 4, further comprising a second capacitor for causing the operational amplifier to serve as a low-pass filter so that an AC amplification factor is greatly lowered to remove AC ripple components included in the ring trip current.

21. The analog subscriber matching circuit of claim 5, further comprising a second capacitor for causing the operational amplifier to serve as a low-pass filter so that an AC amplification factor is greatly lowered to remove AC ripple components included in the ring trip current.

22. The analog subscriber matching circuit of claim 6, further comprising a second capacitor for causing the operational amplifier to serve as a low-pass filter so that an AC amplification factor is greatly lowered to remove AC ripple components included in the ring trip current.

23. The analog subscriber matching circuit of claim 7, further comprising a second capacitor for causing the operational amplifier to serve as a low-pass filter so that an AC amplification factor is greatly lowered to remove AC ripple components included in the ring trip current.

24. The analog subscriber matching circuit of claim 8, further comprising a second capacitor for causing the operational amplifier to serve as a low-pass filter so that an AC amplification factor is greatly lowered to remove AC ripple components included in the ring trip current.

25. The analog subscriber matching circuit of claim 1, further comprising a field effect transistor for causing the operational amplifier to serve as a low-pass filter in a ring current supply state.

26. The analog subscriber matching circuit of claim 2, further comprising a field effect transistor for causing the operational amplifier to serve as a low-pass filter in a ring current supply state.

27. The analog subscriber matching circuit of claim 3, further comprising a field effect transistor for causing the operational amplifier to serve as a low-pass filter in a ring current supply state.

28. The analog subscriber matching circuit of claim 4, further comprising a field effect transistor for causing the operational amplifier to serve as a low-pass filter in a ring current supply state.

29. The analog subscriber matching circuit of claim 5, further comprising a field effect transistor for causing the operational amplifier to serve as a low-pass filter in a ring current supply state.

30. The analog subscriber matching circuit of claim 6, further comprising a field effect transistor for causing the operational amplifier to serve as a low-pass filter in a ring current supply state.

* * * * *